United States Patent [19]
Diamond

[11] 3,821,289
[45] June 28, 1974

[54] TETRAHYDRONAPHTHYLALKANOIC ACIDS AND THEIR DERIVATIVES

[75] Inventor: Julius Diamond, Lafayette Hill, Pa.

[73] Assignee: William H. Rorer, Inc., Fort Washington, Pa.

[22] Filed: July 3, 1972

[21] Appl. No.: 268,718

[52] U.S. Cl... 260/501.16, 260/247.1, 260/247.2 A, 260/268 C, 260/393.62, 260/455 C, 260/465 F, 260/469, 260/470, 260/471 R, 260/472, 260/473 F, 260/488 CD, 260/500.5 H, 260/501.11, 260/501.21, 260/516, 260/518 A, 260/558 R, 260/515 A, 260/558 A, 260/558 H, 260/559 R, 260/559 H, 260/559 A, 260/559, 260/268 R, 260/448 R, 260/248, 260/250, 260/267, 260/304, 260/308, 260/309, 260/315, 260/316, 260/324, 260/317, 260/333, 260/319

[51] Int. Cl. ............................................ C07c 63/50
[58] Field of Search .................. 260/501.16, 515 A

[56] References Cited
OTHER PUBLICATIONS

Oka, Chemical Abstracts, Vol. 55, Col. 24656, (1961).

*Primary Examiner*—Leon Zitver
*Assistant Examiner*—Michael W. Glynn
*Attorney, Agent, or Firm*—James A. Nicholson

[57] ABSTRACT

Novel tetrahydronaphthylalkanoic acids and their derivatives such as the alpha-(5,6,7,8-tetrahydro-4-chloro-2-naphthyl) propionic acid and its diethylamine salt, useful in the treatment of inflammation and associated pain and fever, are disclosed.

2 Claims, No Drawings

TETRAHYDRONAPHTHYLALKANOIC ACIDS AND THEIR DERIVATIVES

SUMMARY OF THE INVENTION

This invention describes novel tetrahydronaphthylalkanoic acids and their derivatives and their use in therapeutic compositions. In addition, this invention describes the preparation of these tetrahydronaphthylalkanoic acids and their derivatives. When the compounds of this invention are administered to mammals, they afford significant treatment for the relief of inflammation and associated pain and fever.

They further provide analgesic and antipyretic methods for the relief and treatment of pain and fever.

BACKGROUND OF THE INVENTION

Continued studies have been carried out in research to develop drugs which would significantly inhibit the development of inflammation and relieve the pain and fever associated with it. Much of this effort has been carried out in the steroid field; however, there have been compounds developed which are non-steroidal and have included such as the alkanoic acids derived from the cycloalkylphenyl ring system.

I have unexpectedly found that substituted tetrahydro-2-naphthylacetic acid compounds possess pharmacological properties which are useful for the relief and inhibition of inflammation conditions.

I have also found that the compounds of this invention are effective in the treatment of inflammation and the control of arthritic conditions associated with inflammation.

I have further found that tetrahydro-2-naphthylacetic acids and their derivatives are novel.

I have also found that the compounds of this invention possess useful analgesic and antipyretic properties and are useful in the treatment of pain and fever.

I have still further found an entirely new class of antiinflammatory, analgesic and antipyretic pharmaceutical compositions which contain tetrahydro-2-naphthylacetic acids or derivatives thereof as active ingredient.

I have also found a convenient method for synthesizing these compounds.

DESCRIPTION AND PREFERRED EMBODIMENTS

This invention comprises a class of novel chemical compounds which are 5,6,7,8-tetrahydro-2-naphthylacetic acids or derivatives. Also the tetrahydronaphthyl ring may further be substituted.

This invention also describes a new method for treating inflammation as well as pain and fever and also novel therapeutic compositions.

The compounds of this invention can be represented by the generic structure which is described by the general formula I

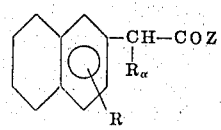

where:
R is hydrogen,
alkyl,
halo,
nitro,
amino,
acylamino,
mono and diloweralkylamino,
mercapto,
acylthio,
hydroxy,
loweralkoxy,
aryloxy,
acyloxy,
haloloweralkyl,
cyano,
acetyl or
benzoyl;
R$_\alpha$ is hydrogen or
loweralkyl;
Z is hydrogen,
—OH,
loweralkoxy,
arloweralkoxy,
—NH$_2$,
loweralkylamino,
diloweralkylamino,
cycloloweralkylamino,

(where A is loweralkylidenyl or heteroloweralkylidenyl),

—NHOH,
—NHNH$_2$ or
—OM (where M is an alkali, alkaline earth or aluminum metal or an ammonium salt).

The preferred compounds of this invention are described by formula I where R is in the 4-position and R$_\alpha$ is loweralkyl.

The more preferred compounds are those where R is 4-halo or 4-nitro and R$_\alpha$ is loweralkyl.

The most preferred compounds are those where R is 4-halo or 4-nitro, R$_\alpha$ is loweralkyl and Z is —OH, amino, diloweralkylamino and —OM.

The compounds of this invention contain at least one asymmetric carbon atom in the acid side chain. As a result, the above compounds of formula I may be obtained as racemic mixtures of their dextro (+) and levorotatory (−) isomers. It is to be understood that said $d$ and $l$ isomers as well as the $dl$ mixtures thereof are embraced within the scope of this invention.

The compounds of this invention may be prepared from known starting materials. References to specific starting materials are given where applicable or the following methods of synthesis may be used where appropriate.

Condensation of 5,6,7,8-tetrahydronaphthlene with an alkyl or aralkyl oxalyl chloride in the presence of anhydrous aluminum chloride results in 5,6,7,8-tetrahydro-2-naphthylglyoxylate. This may then be reacted with an alkyl Grignard reagent to form the α-alkyl-5,6,7,8-tetrahydro-2-naphthylglycolate or it may be reduced to the glycolate by catalytic hydrogenation with platinum oxide or under sodium borohydride conditions.

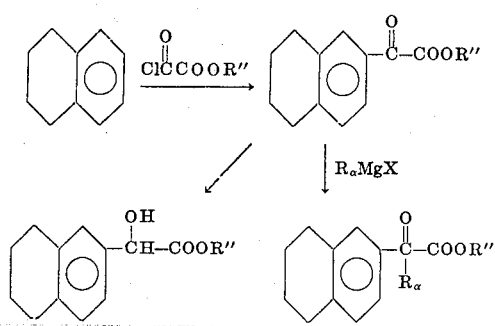

Reaction of the glycolate ester with an acyl chloride X'Cl or acyl anhydride X'OX' in the presence of a tertiary amine such as pyridine, picoline, or quinoline results in the formation of an acyloxy compound. Examples of X'Cl and X'OX' include acetyl chloride, acetic anhydride, propionyl chloride, butyryl chloride, etc.

Reduction of the 5,6,7,8-tetrahydro-2-naphthylglycolate in the presence of a heterogeneous catalyst such as palladium in the usual manner results in the desired 5,6,7,8-tetrahydro-2-naphthylacetate. This reduction can further be carried out on the acyloxy compound to obtain the desired acetic acid.

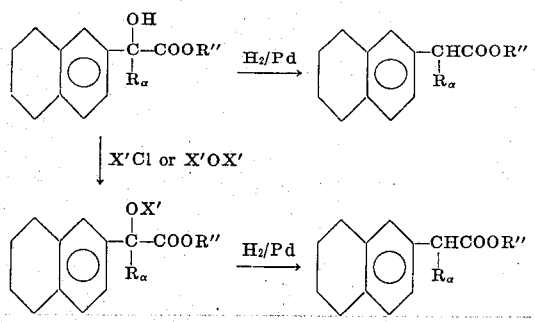

where $R_\alpha$ is hydrogen or loweralkyl.

The 5,6,7,8-tetrahydro-2-naphthylacetate esters or corresponding α-alkyl compound may then be hydrolyzed in basic medium to the corresponding acetic acid compounds.

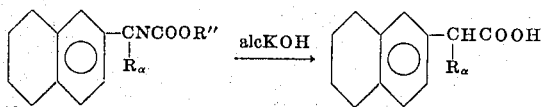

The acid addition salts may be formed by the action of one equivalent of a suitable base with the 5,6,7,8-tetrahydro-2-naphthylacetic acid or 5,6,7,8-tetrahydro-2-naphthyl-α-alkylacetic acid. Suitable bases thus include for example the alkali metal alkoxides such as sodium methoxide, etc., and the alkali metal and alkaline earth metal hydroxides, carbonates, bicarbonates, etc., (such as sodium hydroxide, potassium hydroxide, calcium hydroxide, potassium carbonate, sodium bicarbonate, magnesium bicarbonate, etc.). Also, the aluminum salts of the instant products may be obtained by treating the corresponding sodium salt with an appropriate aluminum complex such as aluminum hydroxy chloride hexahydrate, etc. The ammonium salts may be made by reaction with the corresponding amine such as methylamine, diethylamine, β-hydroxyethylamine, piperazine, piperidine, α-methylbenzylamine, cyclohexylamine, triethylamine, phenethylamine, etc.

Reaction of a 5,6,7,8-tetrahydro-2-naphthylacetate or 5,6,7,8tetrahydro-2-naphthyl-α-alkylacetate with a nitrogen base such as ammonia, loweralkylamine, diloweralkylamine, cycloloweralkylamine, a nitrogen containing hetero compound such as piperidine, morpholine, piperazine results in the corresponding amide. The acetate with hydroxy amine gives the corresponding hydroxamic acid, and with hydrazine gives the corresponding hydrazide.

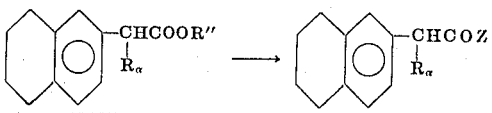

where:
Z is —NH$_2$,
loweralkylamine,
diloweralkylamino,
cycloloweralkylamino,

(where B is loweralkylidenyl or heteroloweralkylidenyl),
—NHOH or
—NHNH$_2$.

The 5,6,7,8-tetrahydro-2-naphthyl-α-halo acetamides, acethydroxamic acids, and acethydrazides, can be prepared from the corresponding glycolamides with thionyl halides according to the method of I. A. Smith, Chem. Berichte 71B:634 (1938).

Appropriately desired end products having various R substituents can be prepared at various stages of the synthesis by using suitable reactions in order to convert one group to another. Thus, for example, the glyoxylates may be alkylated, halogenated or nitrated to obtain substitution in the 4-position.

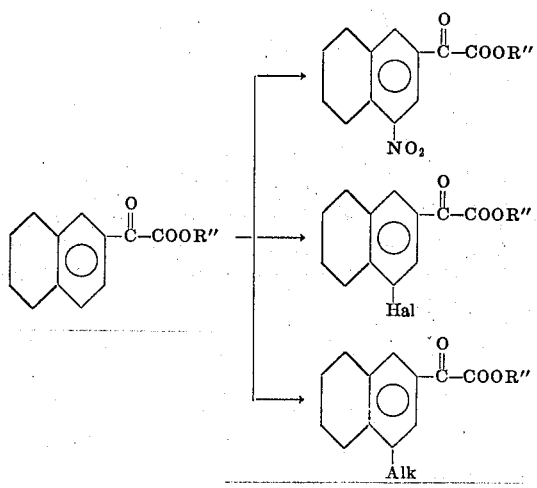

A nitro glyoxylate may be hydrogenated to the corresponding amine.

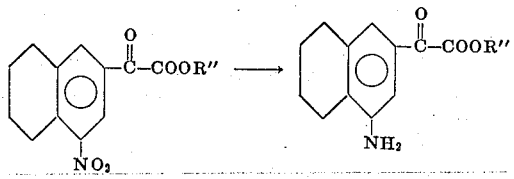

An amino compound may be diazotized and heated in an aqueous medium to form the hydroxy compound or heated in an alcohol to form the alkoxy compound. The hydroxyl group may also be alkylated with loweralkyl halides or sulfates to the alkoxyl group or acylated with loweracyl chlorides or anhydrides to the acyloxy compound in the presence of a tertiary amine such as pyridine.

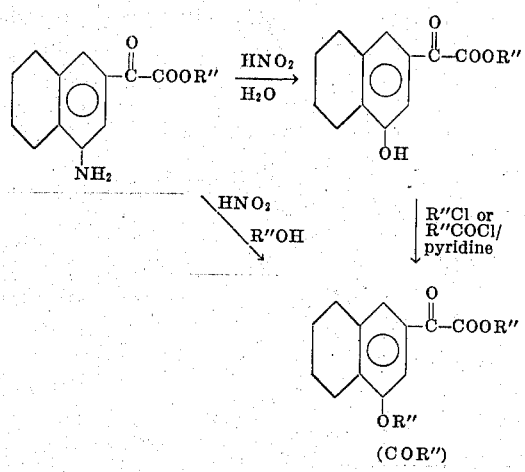

An amino compound may be mono- or dialkylated with loweralkyl halides or sulfates or acylated with loweracyl chlorides or anhydrides.

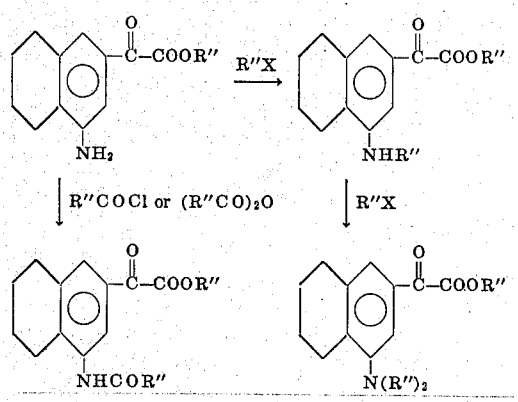

An amino compound may be diazotized followed by a Sandmeyer type reaction to yield the halo group.

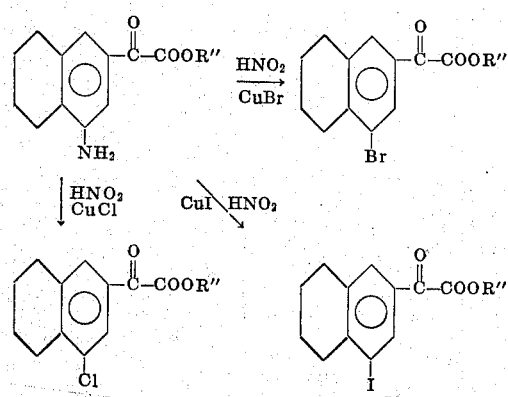

An amino compound may also be diazotized to the diazonium fluoroborate which is then thermally decomposed to the corresponding fluoro compound.

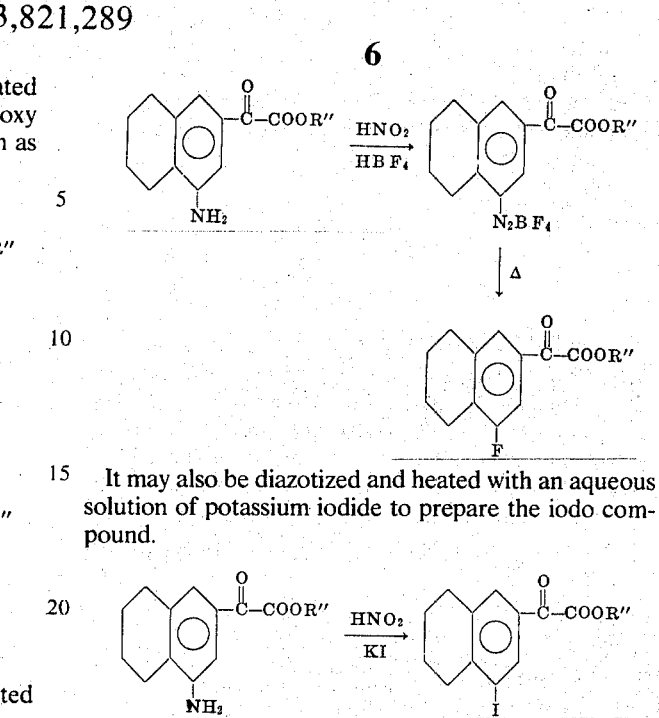

It may also be diazotized and heated with an aqueous solution of potassium iodide to prepare the iodo compound.

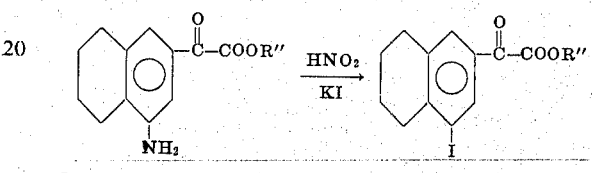

It may further be diazotized and followed by addition of cuprous cyanide to obtain the cyano compound.

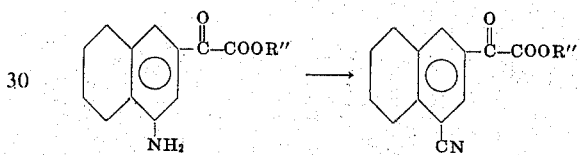

An aminoglyoxylate may be diazotized followed by reaction with potassium ethylxanthate followed by hydrolysis to obtain the mercaptoglycolate which can be esterified to a mercapto glyoxylate. This in turn can be lower alkylated to the lower alkylthio and oxidized to the loweralkylsulfinyl and loweralkylsulfonyl groups or acylated to the acylthio compounds.

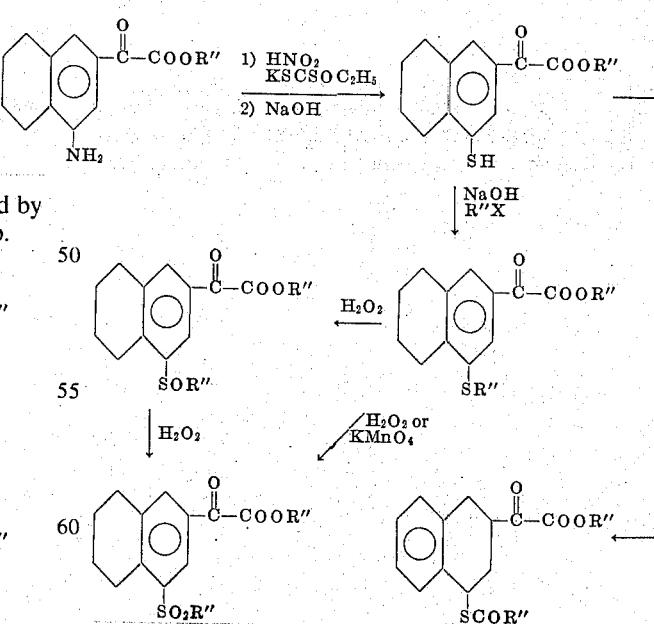

A halo compound in which halo is chloro or bromo or iodo may be reacted with cuprous cyanide in quinoline at about 150°C to produce a cyano compound:

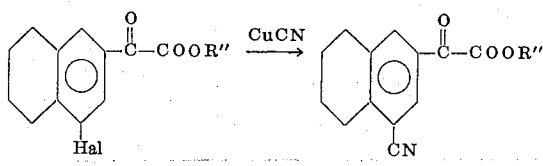

or reacted with trifluoromethyliodide and copper powder at about 150°C in dimethylformamide to obtain a trifluoromethylglyoxylate or lactate: [as described in Tetrahedron Letters: 47, 4095 (1959)]

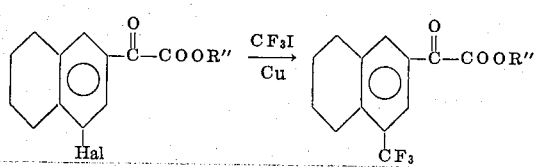

A haloglyoxylate may also be reacted with cuprous methanesulfinate in quinoline at about 150°C to obtain a methylsulfinylglyoxylate.

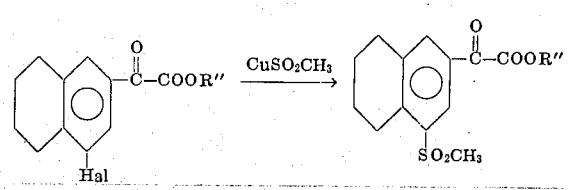

The substituted glyoxylates may then be selectively reduced to the glycolates or reacted with an alkyl Grignard reagent as above.

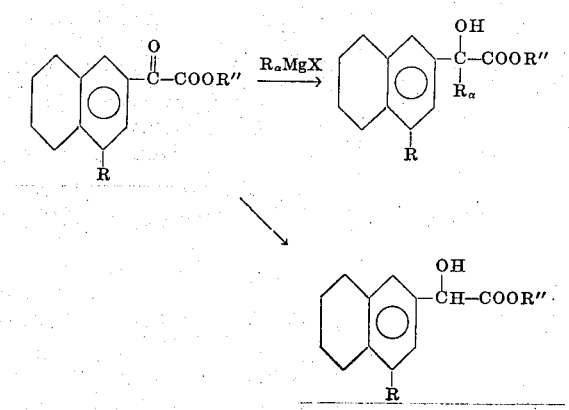

When it is desired to have substitution in other than the 4-position it is convenient to carry out the original Friedel-Crafts reaction on a 3-substituted-5,6,7,8-tetrahydronaphthene which will result in directing the introduction of the glyoxylate side chain to the ortho position. Upon reduction to the resultant glycolate, conversion of the initial substituent may be carried out as above to obtain that substituent which is desired. Thus, for example, a 1 or 3-methyl, halo or acylamino compound may be subjected as above to a Friedel-Crafts reaction using t-butyl oxalyl chloride to obtain the corresponding 2-naphthylglyoxylate, which in turn may then be reduced to the glycolate. Deacylation of the amino compound may then be carried out which in turn may be diazotized and converted to several groups as above.

Of course it will be understood by one skilled in the art that variations in the above procedures can be employed which will provide that sequence of reactions which will result in the desired product.

The products of this invention are obtained as racemic mixtures of their dextro and levorotatory isomers since the $\alpha$-carbon of the side chain is asymmetric. These may be resolved into the dextro and levorotatory optical isomers by conventional methods.

One method of resolution that may be employed is combining the racemic compound with an optically active compound by salt formation, ester formation, or amide formation to form two diastereomeric products. If the instant acids are added to an optically active base, then two diastereomeric salts are produced which possess different properties and different solubilities and can be separated by fractional crystallization. When the salts have been completely separated by repeated crystallization, the base is split off by acid hydrolysis and the pure $d$ and $l$ acids are obtained. Preferably, the acid is reacted in alcoholic or acetone solution with an equivalent amount of the optically active primary, secondary or tertiary amine such as cinchonidine, cinchonine, quinine, ephedrine, $\alpha$-methylbenzylamine, sec-butylamine, sec-amylamine, etc. The diastereomeric amine salts produced thereby, are separated by fractional crystallization and each optically active salt is hydrolyzed with dilute mineral acid to produce the dextro or levo form of that acetic acid. Each optical isomer may be reacted then with X'-Cl or XOX' to produce the corresponding optically active alcoholic derivative. Alternatively, an alkanoate ester may be reacted with an optically active primary or secondary amine such as ephedrine, $\alpha$-methylbenzylamine, sec-butylamine, etc., to produce a mixture of diastereomeric acetates which may be separated by fraction crystallization. Each optically active amide may be hydrolyzed with mineral acid to its respective optically active acid.

Alternatively, an acetate may be reacted with an optically active alcohol such as $l$-menthol or $d$-borneol, or $l$-$\alpha$-methylbenzylalcohol, to produce a mixture of diastereomeric acetate esters which may be separated by fractional crystallization. Each optically active ester may be hydrolyzed with mineral acid or alkali to its respective optically active acid. The optically active acids can also be recovered from the $\alpha$-methylbenzyl esters by hydrogenolysis in the presence of palladium.

I have found that the compounds of this invention exercise a useful degree of anti-inflammatory activity in mammals and are effective in the treatment of associated pain and fever and in like conditions which are responsive to treatment with anti-inflammatory agents. In general, the compounds of this invention are indicated for a wide variety of mammalian conditions where the symptoms of inflammation and associated fever and pain are manifested. Exemplary of such conditions are: rheumatic diseases such as rheumatoid arthritis, osteoarthritis and other degenerative joint diseases; soft-tissue rheumatism such as tendinitis; muscular rheumatism such as sciatica; pain and inflammation associated with dental surgery and similar human and veterinary disease conditions exhibiting the foregoing symptoms requiring the use of an anti-inflammatory, analgesic and/or an antipyretic agent.

For these purposes, the compounds of this invention are normally administered orally, topically, parenterally or rectally. Orally, these may be administered in tablets, capsules, suspensions or syrups; the optimum dosage, of course, depending on the particular compound being used and the type and severity of the condition being treated. In any specific case the appropriate dosage selected will further depend on factors of the patient which may influence response to the drug; for example, general health, age, weight, etc. Although the optimum quantities of the compounds of this invention to be used in such manner will depend on the compound employed and the particular type of disease condition treated, oral dose levels of preferred compounds when administered to a mammal in dosages of 0.5 to 100 milligrams per kilogram of body weight per day are particularly useful. The preferred range is 0.5 to 15 mg/kg. Comparative dosages may be used in topical, parenteral or rectal administration.

Dosage forms may be prepared according to any method known to the art for the manufacture of pharmaceutical compositions and such compositions may contain one or more agents; for example, sweetening agents, flavoring agents, coloring agents, preserving agents, etc. Further, the active compounds or their derivatives may be administered alone or in admixture with antacids such as sodium bicarbonate, magnesium carbonate, magnesium hydroxide, aluminum hydroxide, magnesium silicate, etc., and non-toxic pharmaceutically acceptable excipients. Such excipients may be, for example, inert diluents such as calcium carbonate, lactose, etc., granulating and disintegrating agents; for example, magnesium stearate, talc. etc., binding agents; for example, starch gelatin, etc., suspending agents; for example, methylcellulose, vegetable oil, etc., dispersing agents; for example, lecithin, etc., thickening agents; for example, beeswax, hard paraffin, etc., emulsifying agents; for example, naturally-occuring gums, etc., and non-irritating excipients; for example, cocoa butter and polyethylene glycols.

Various tests in animals can be carried out to show the ability of the 5,6,7,8-tetrahydro-2-naphthylacetic acids and derivatives of this invention to exhibit reactions that can be correlated with anti-inflammatory activity in humans. One such test is the Carrageenan paw edema test, which shows the ability of the instant compounds to inhibit edema induced by injection of an inflammatory agent such as carrageenan into the tissues of the paw of a rat against non-inflamed controls. This carrageenan testing method is known to correlate well with anti-inflammatory activity in humans and is a standard test used to determine anti-inflammatory activity. This correlation can be shown by the activities of compounds known to be clinically active including such as aspirin, phenylbutazone, cortisone, hydrocortisone and prednisolone. In view of the results of this test, the 5,6,7,8-tetrahydro-2-naphthylacetic acids and derivatives can be considered to be active anti-inflammatory agents.

One method for measuring the pain threshold of the compounds of this invention is the Randall-Selitto test. Analgesic activity is shown by antinociceptive testing of the inflammed foot of rats and a measurement of their pain response.

Antipyretic assay is carried out by yeast-induced fever tests of subcutaneously injected rats. The measurement of rectal temperature is carried out to determine the response by the test compounds.

In view of the results of the above tests, the 5,6,7,8-tetrahydro-2-naphthylacetic acids and derivatives of this invention are considered to have valuable analgesic and antipyretic properties.

Other tests which can be correlated to show significant activities are the "phenylquinone writhing" test for analgesia, "polyarthritis in rats" and "ultra-violet erythema in guinea pigs."

The following are detailed examples which show the preparation of the compounds of this invention. They are to be construed as illustrations of said compounds and are not intended to be limitations thereof.

Example 1

Ethyl 5,6,7,8-tetrahydro-2-naphthylglyoxylate 5,6,7,8-Tetrahydro-2-naphthlene (0.33 mole) and 50.5 g. (0.37 mole) of ethyl oxalyl chloride are dissolved in 200 ml. of dry 1,1,2,2-tetrachloroethane. Anhydrous aluminum chloride 52 g. (0.39 mole) is added in small portions to the reaction mixture with stirring over 2 hours. During the addition, the temperature of the mixture is maintained between 16–18°C. The mixture is stirred for an additional hour and allowed to stand overnight. The solution is then slowly poured into 1500 ml. of iced saline solution with stirring. After standing, two layers form. The aqueous layer is extracted with 500 ml. of ether and the ether extract is combined with the organic layer which is dissolved in 1500 ml. of ether and separated. The ether solution is washed with 10 × 100 ml. portions of a 1:1 mixture of saturated sodium chloride solution and 10% HCl solution, and 5 × 100 ml. portions of water. The ether solution is then dried over anhydrous magnesium sulfate for 1 hour and filtered. The solvents are removed by distillation under reduced pressure and the residue distilled to obtain ethyl 5,6,7,8-tetrahydro-2-naphthylglyoxylate.

When ethyl oxalyl chloride in the above example is replaced with methyl oxalyl chloride, propyl oxalyl chloride, i-propyl oxalyl chloride, t-butyl oxalyl chloride, or benzyl oxalyl chloride then the product obtained is the methyl, propyl, i-propyl, t-butyl, or benzyl ester of 5,6,7,8-tetrahydro-2-naphthylglyoxylate.

Example 2

Ethyl 4-chloro-5,6,7,8-tetrahydro-2-naphthylglyoxylate

Ethyl 5,6,7,8-tetrahydro-2-naphthylglyoxylate (0.38 mole) and 6.1 g. of iodine (0.048 mole) are dissolved in 100 ml. of carbon tetrachloride. To this solution is added a solution of 40.4 g. (0.57 mole) of chlorine dissolved in 365 ml. of carbon tetrachloride over a period of 2 hours. During the addition, the temperature of the reaction mixture is maintained at 0°C. The mixture is stirred for 3 hours and allowed to stand with gradual warming to room temperature over 15 hours. The solvent is removed by distillation under reduced pressure. The residue is fractionally distilled to obtain ethyl 4-chloro-5,6,7,8-tetrahydro-2-naphthylglyoxylate.

When ethyl 5,6,7,8-tetrahydro-2-naphthylglyoxylate in the above example is replaced with the esters of Example 1 then the corresponding product is prepared.

Example 3

When bromine is used in place of chlorine in Example 2, the corresponding products are obtained.

Example 4

Ethyl 4-nitro-5,6,7,8-tetrahydro-2-naphthylglyoxylate

Ethyl 5,6,7,8-tetrahydro-2-naphthylglyoxylate (0.066 mole) is added to ice-cold concentrated sulfuric acid (18 ml) and stirred with cooling for 5 minutes. Concentrated nitric acid (Sp. G. 1.51) (2.5 ml) is added dropwise, maintaining the temperature between 30° and 40° by water cooling if necessary. After addition of the nitric acid is complete, the mixture is stirred for one-half hour, then poured into water. The mixture is made alkaline with sodium hydroxide, then extracted with ether. The ether extract is washed, dried over sodium sulfate, evaporated and the residue is fractionally distilled to obtain ethyl 4-nitro-5,6,7,8-tetrahydro-2-naphthylglyoxylate.

When ethyl p-cyclohexylphenylglyoxylate in the above example is replaced by the esters of Example 1, then the corresponding product is prepared.

Example 5

Ethyl 4-trifuloromethyl-5,6,7,8-tetrahydro-2-naphthylglyoxylate

To a solution of 0.01 moles of ethyl 4-bromo-5,6,7,8-tetrahydro-2-naphthylglyoxylate in 50 ml. of dimethylformamide is added 0.15 moles of trifluoromethyl iodide and 0.02 g. of copper powder. The reaction is shaken in a sealed tube for 5 hours at 140°C, cooled, and then filtered and evaporated in vacuo. 200 ml. of water is added to the residue and extracted with ether. The ether extract is dried, evaporated to dryness and distilled to obtain ethyl 4-trifluoromethyl-5,6,7,8-tetrahydro-2-naphthylglyoxylate.

When ethyl 4-bromo-5,6,7,8-tetrahydro-2-naphthylglyoxylate in the above example is replaced by equimolar amounts of the compounds of Example 3 then the corresponding product is obtained.

Example 6

Ethyl 4-amino-5,6,7,8-tetrahydro-2-naphthylglyoxylate

A mixture of 0.05 moles of ethyl 4-nitro-5,6,7,8-tetrahydro-2-naphthylglyoxylate in 100 ml. methanol containing 0.05 mole citric acid and 1.5 g. of 5% palladium-on-carbon is shaken with hydrogen at 3 atm. pressure and 27°C until 3 moles of hydrogen are absorbed. The mixture is filtered, washed with methanol and the filtrate concentrated in vacuo to obtain ethyl 4-amino-5,6,7,8-tetrahydro-2-naphthylglyoxylate, isolated as the citrate salt.

When ethyl 4-nitro-5,6,7,8-tetrahydro-2-naphthylglyoxylate in the above example is replaced by equimolar amounts of the compounds of Example 4, then the corresponding products are obtained.

Example 7

Ethyl 4-methylamino-5,6,7,8-tetrahydro-2-naphthylglyoxylate

To a solution of 0.01 moles of ethyl 4-amino-5,6,7,8-tetrahydro-2-naphthylglyoxylate in 100 ml. of pyridine is added 0.1 moles of methyl iodide. The reaction mixture is stirred overnight at room temperature, filtered and concentrated. The residue is distilled to obtain ethyl 4-methylamino-5,6,7,8-tetrahydro-2-naphthylglyoxylate.

When ethyl 4-amino-5,6,7,8-tetrahydro-2-naphthylglyoxylate in the above example is replaced by equimolar amounts of the compounds of Example 6, then the corresponding products are obtained.

When 0.01 moles of acetyl chloride is used in place of methyl iodide in the above example, then the product prepared is ethyl 4-acetylamino-5,6,7,8-tetrahydro-2-naphthylglyoxylate.

Example 8

Ethyl 4-dimethylamino-5,6,7,8-tetrahydro-2-naphthylglyoxylate

A solution of 0.005 moles of ethyl 4-nitro-5,6,7,8-tetrahydro-2-naphthylglyoxylate and 1.6 ml. of 37% formaldehyde in 50 ml. of methanol is shaken with hydrogen over 0.5 g. of 5% palladium-on-charcoal at 42 lbs. and 27°C. until 5 moles of hydrogen are absorbed. The catalyst is filtered off and the filtrate is evaporated in vacuo. The residue is then distilled to obtain ethyl 4-dimethylamino-5,6,7,8-tetrahydro-2-naphthylglyoxylate.

When ethyl 4-nitro-5,6,7,8-tetrahydro-2-naphthylglyoxylate in the above example is replaced by equimolar amounts of the compounds of Example 4, then the corresponding products are obtained.

Example 9

Ethyl 4-cyano-5,6,7,8-tetrahydro-2-naphthylglyoxylate

To 0.1 moles of ethyl 4-amino-5,6,7,8-tetrahydro-2-naphthylglyoxylate in 35 ml. of 28% hydrochloric acid and 100 ml. of cracked ice to maintain the temperature at 0°C is added a solution of 7.1 g. (0.102 moles) of sodium nitrite in 20 ml. of water. The reaction mixture is then neutralized with sodium carbonate. This diazonium mixture is added to a cuprous cyanide solution (prepared from 31.5 g. of copper sulfate and 16.2 g. of sodium cyanide in 75 ml. of water). 250 ml. of toluene is also added and the mixture is stirred for one-half hour. The reaction is then allowed to stir an additional 2 hours while warming gradually to 50°C. This is then cooled and the toluene separated, dried over sodium sulfate and evaporated to dryness to obtain ethyl 4-cyano-5,6,7,8-tetrahydro-2-naphthylglyoxylate.

When ethyl 4-amino-5,6,7,8-tetrahydro-2-naphthylglyoxylate in the above example is replaced by equimolar amounts of the compounds of Example 6, then the corresponding products are obtained.

Example 10

Ethyl 4-fluoro-5,6,7,8-tetrahydro-2-naphthylglyoxylate

To 0.15 moles of ethyl 4-amino-5,6,7,8-tetrahydro-2-naphthylglyoxylate is added at 0°C 144 ml or 1.5 moles of concentrated hydrochloric acid. The reaction mixture is maintained at 0°C and the diazonium salt is prepared with 23.2 g. (0.32 moles) of 95% sodium nitrite in 80 ml. of water. To this mixture is rapidly added a solution of 10.4 g. (0.17 moles) of boric acid dissolved in 22 g. (0.66 moles) of 60% hydrofluoric acid. The reaction mixture is then stirred for one-half hour and filtered, washed with 3 × 25 ml. of water, 2 × 25 ml. of methanol and 25 ml. of ether. The residual cake is then treated in vacuo. The treated cake is then placed in a distilling flask and heated to permit spontaneous decomposition. After the decomposition, the residue is then fractionally distilled to obtain ethyl 4-fluoro-5,6,7-tetrahydro-2-naphthylglyoxylate.

When ethyl 4-amino-5,6,7,8-tetrahydro-2-naphthylglyoxylate in the above example is replaced by the compounds of Example 6, then the corresponding products are obtained.

Example 11

4-Hydroxy-5,6,7,8-tetrahydro-2-naphthylglyoxylic acid

To 4.5 g. of 4-amino-5,6,7,8-tetrahydro-2-naphthylglyoxylic acid suspension in 125 ml. of 30% hydrochloric acid and cooled to 0°C is added dropwise a solution of 1.2 g. of sodium nitrite in 15 ml. of water. After about 10 min., 200 ml. of 15% hydrochloric acid is added portion wise and stirred for 15 hours. The reaction mixture is then poured onto ice water and extracted with chloroform, dried over sodium sulfate and concentrated in vacuo. The residue is crystallized to obtain 4-hydroxy-5,6,7,8-tetrahydro-2-naphthylglyoxylic acid.

The ethyl ester of the product is formed by reaction with absolute ethanol containing a small amount of anhydrous hydrochloric acid.

When 4-amino-5,6,7,8-tetrahydro-2-naphthylglyoxylic acid in the above example is replaced by equimolar amounts of the compounds of Example 6, then the corresponding products are obtained.

Example 12

Ethyl 4-methoxy-5,6,7,8-tetrahydro-2-naphthylglyoxylate

To a stirred suspension of 0.01 moles of sodium hydride in 25 ml. of dry dimethylformamide which has been cooled to 0°C is added dropwise a solution of 0.01 moles of ethyl 4-hydroxy-5,6,7,8-tetrahydro-2-naphthylglyoxylate in 10 ml. of dimethylformamide. The reaction mixture is stirred for 15 minutes and 0.015 moles of methyliodide is then added dropwise. The mixture is allowed to stir overnight at room temperature. 200 ml. of water is added and the resulting mixture is extracted well with ether. The ether extract is washed with water, dried over sodium sulfate, evaporated to dryness and distilled to obtain ethyl 4-methoxy-5,6,7,8-tetrahydro-2-naphthylglyoxylate.

When ethyl 4-hydroxy-5,6,7,8-tetrahydro-2-naphthylglyoxylate in the above example is replaced by equimolar amounts of the compounds of Example 11, then the corresponding products are obtained.

When 0.01 moles of acetyl chloride is used in place of methyliodide in the above reaction, then the product prepared is ethyl 4-acetyloxy-5,6,7,8-tetrahydro-2-naphthylglyoxylate.

Example 13

4-Bromo-5,6,7,8-tetrahydro-2-naphthylglyoxylic acid

To 0.044 moles of 4-amino-5,6,7,8-tetrahydro-2-naphthylglyoxylic acid suspension in 225 ml. of 40% hydrobromic acid and cooled to 0°C is added dropwise a solution of 2.34 g. of sodium nitrite in 30 ml. of water. To this mixture is added a solution of 20 g. of cuprous bromide in 350 ml. of 40% hydrobromic acid portion wise and stirred for 15 hours. The reaction mixture is then poured onto ice water, extracted with chloroform, dried over sodium sulfate and concentrated in vacuo. The residue is then crystallized to obtain 4-bromo-5,6,7,8-tetrahydro-2-naphthylglyoxylic acid.

The ethyl ester of the product is formed by reaction with absolute ethanol containing a small amount of anhydrous hydrochloric acid.

When 4-amino-5,6,7,8-tetrahydro-2-naphthylglyoxylic acid in the above example is replaced by the compounds of Example 6, then the corresponding products are obtained.

Example 14

4-Iodo-5,6,7,8-tetrahydro-2-naphthylglyoxylic acid

To .05 moles of 4-amino-5,6,7,8-tetrahydro-2-naphthylglyoxylic acid dissolved in a mixture of 50 g. of ice water and .06 moles of concentrated sulfuric acid at 0°C is added a solution of 0.05 moles of 95% sodium nitrite in 8 ml of water. Stirring is continued for one-half hour and then 1.5 ml. of concentrated sulfuric acid is added. This solution is poured into an ice cold solution of .06 moles of potassium iodide in 10 ml. of water. To this is added 0.075 g. copper bronze with stirring and the solution is warmed slowly on a water bath to about 80°C for 2 hours. After cooling to room temperature the reaction mixture is extracted thrice with 15 ml. portions of chloroform. This is then washed with dilute thiosulfate solution, water, dried over sodium sulfate and evaporated in vacuo. The residue is crystallized to obtain 4-iodo-5,6,7,8-tetrahydro-2-naphthylglyoxylic acid.

The ethyl ester of the product is formed by reaction with absolute ethanol containing a small amount of anhydrous hydrochloric acid.

When 4-amino-5,6,7,8-tetrahydro-2-naphthylglyoxylic acid in the above example is replaced by equimolar amounts of the compounds of Example 6, then the corresponding products are obtained.

Example 15

4-Mercapto-5,6,7,8-tetrahydro-2-naphthylglyoxylic acid

To 0.068 moles of ethyl 4-amino-5,6,7,8-tetrahydro-2-naphthylglyoxylate in 11.1 ml. of concentrated hydrochloric acid and 20 g. of ice is added 4.1 g. of sodium nitrite in 2 ml. of water. This mixture is stirred for 10 min. and then added gradually to an ice cold solution of 10.3 g. of potassium ethyl xanthate in 14 ml. of water. The reaction is gradually heated over 45 minutes to 50°C and stirred an additional 45 minutes. The mixture is then cooled, extracted with ether which is then washed with water, dilute sodium hydroxide and water, dried over sodium sulfate and evaporated in vacuo. The residue is dissolved in 35 ml. of boiling ethanol to which is added gradually 13 g. of potassium hydroxide. The reaction is refluxed an additional hour and then evaporated to dryness in vacuo. The residue is dissolved in water and extracted with ether. The alkaline phase is acidified with 6N sulfuric acid and extracted with ether. The ether is washed with water, dried over sodium sulfate and evaporated to dryness to obtain 4-mercapto-5,6,7,8-tetrahydro-2-naphthylglyoxylic acid.

The ethyl ester of the product is formed by reaction with absolute ethanol containing a small amount of anhydrous hydrochloric acid.

When ethyl 4-amino-5,6,7,8-tetrahydro-2-naphthylglyoxylate in the above example is replaced by equimolar amounts of the compounds of Example 6, then the corresponding products are prepared.

Example 16

4-Amino-5,6,7,8-tetrahydro-2-naphthylglyoxylic acid

To 0.014 moles of ethyl 4-mercapto-5,6,7,8-tetrahydro-2-naphthylglyoxylate in 40 ml. of water containing 0.65 g. of sodium hydroxide is added 2 ml. of dimethyl sulfate with stirring. The reaction mixture is gradually warmed to 40°C and stirred for 2 hours. The mixture is cooled and extracted with ether which is washed with water, dried and evaporated in vacuo. The residue is distilled to obtain 4-amino-5,6,7,8-tetrahydro-2-naphthylglyoxylic acid.

When the above 4-methylthio-5,6,7,8-tetrahydro-2-naphthylglyoxylic acid is treated with 30% $H_2O_2$, then the resultant product is 4-methylsulfinyl-5,6,7,8-tetrahydro-2-naphthylglyoxylic acid or 4-methylsulfonyl-5,6,7,8-tetrahydro-2-naphthylglyoxylic acid.

When 4-mercapto-5,6,7,8-tetrahydro-2-naphthylglyoxylic acid in the above example is replaced by the compounds of Example 15, then the corresponding products are prepared.

When an equimolar amount of acetyl chloride is used in place of dimethyl sulfate in the above reaction, then the product prepared is 4-acetylthio-5,6,7,8-tetrahydro-2-naphthylglyoxylic acid.

Example 17

Ethyl 4-chloro-5,6,7,8-tetrahydro-2-naphthylglycolate

Into a Paar hydrogenation bottle is added 0.144 mole of ethyl 4-chloro-5,6,7,8-tetrahydro-2-naphthylglyoxylate, 2 ml. of 0.1 M — ferrous sulfate solution; 220 ml. of isopropanol, and 1.0 g. of 84.1% platinum oxide. The mixture is shaken for 2 hours at room temperature with hydrogen gas until 0.144 mole of hydrogen is absorbed. The catalyst is then filtered off and the solution is evaporated in vacuo and the residue fractionally distilled to obtain ethyl 4-chloro-5,6,7,8-tetrahydro-2-naphthylglycolate.

Example 18

Ethyl 4-nitro-5,6,7,8-tetrahydro-2-naphthylglycolate

A sodium borohydride solution 0.302 mole in 13 ml. of water containing 1 drop of 10 N sodium hydroxide is added dropwise to a stirred solution of 17.9 g. (0.0587 mole) of ethyl 4-nitro-5,6,7,8-tetrahydro-2-naphthylglyoxylate, methanol (50 ml.) and water (5 ml.) cooled in an icewater mixture. The solution is partially neutralized with urea-active acid solution (15 ml. each of acetic acid and urea 0.041 mole). The pH after the addition is near neutral. The pH then is adjusted to acidic by addition of 18 N sulfuric acid (2.8 ml.). The gum product is extracted with ether. The ether extract is washed with 2 × 25 ml. of saturated sodium bisulfite to remove the traces of initial carbonyl compound and then dried over anhydrous sodium sulfite for 2 hours. The drying agent is removed and the solvent is then removed to obtain ethyl 4-nitro-5,6,7,8-tetrahydro-2-naphthylglycolate.

When ethyl 4-nitro-5,6,7,8-tetrahydro-2-naphthylglyoxylate in the above example is replaced by an equimolar amount of the glyoxylate esters of Examples 1-17, then the corresponding glycolate product is prepared.

Example 19

4-Chloro-5,6,7,8-tetrahydro-2-naphthylglycolic acid

To a solution of 0.144 moles of ethyl 4-chloro-5,6,7,8-tetrahydro-2-naphthylglycolate dissolved in 220 ml. of isopropanol is added 38 g. (0.7 mole) of potassium hydroxide. This mixture is then heated at reflux temperature in a nitrogen atmosphere. The solution is concentrated in vacuo to a viscous oil, which is then dissolved in 500 ml. of water and filtered. The filtrate is acidified with 10% HCl and the precipitate is taken up in ether. The ether layer is dried, filtered and the filtrate concentrated to dryness. Recrystallization of residue from benzenecyclohexane 1:1 gives 4-chloro-5,6,7,8-tetrahydro-2-naphthylglycolic acid.

Example 20

Ethyl α-methyl-4-chloro-5,6,7,8-tetrahydro-2-naphthylglycolate

A solution of methylmagnesium iodide is prepared from 6.7 g. (0.047 mole) of methyl iodide, 1.24 g. (0.051 g-atom) of magnesium turnings and 40 ml. of anhydrous ether. This solution is added over a period of 1 hour to a solution of 0.05 mole of ethyl 4-chloro-5,6,7,8-tetrahydro-2-naphthylglyoxylate in ether (100 ml). The addition is carried out with vigorous stirring at 0–5°C. The mixture is then allowed to warm to room temperature over 10 hours. The mixture is poured into an ice-cold solution of 0.2 M-sulfuric acid. The ether layer is separated, extracted with 1% sulfuric acid, dried over magnesium sulfate, filtered and evaporated to obtain ethyl α-methyl-4-chloro-5,6,7,8-tetrahydro-2-naphthylglycolate.

When ethyl 4-chloro-5,6,7,8-tetrahydro-2-naphthylglyoxylate in the above example is replaced by the glyoxylates of this invention, then the corresponding α-methyl products are prepared.

When the Grignard reagent used is ethylmagnesium iodide, propylmagnesium iodide or butylmagnesium iodide, then the corresponding product is prepared.

Example 21

4-Chloro-5,6,7,8-tetrahydro-2-naphthylacetic acid

To a suspension of 0.031 moles of 4-chloro-5,6,7,8-tetrahydro-2-naphthylglycolic acid in 300 ml. of 90% ethanol is added 1 ml. of 0.1M ferrous sulfate solution followed by 0.5 g. of platinum oxide catalyst. The mixture is shaken with hydrogen for 3½ hours. The catalyst is filtered off. The dark yellow filtrate is distilled under reduced pressure to yield 4-chloro-5,6,7,8-tetrahydro-2-naphthylacetic acid.

When 4-chloro-5,6,7,8-tetrahydro-2-naphthylglycolic acid is replaced in the above procedure by the glycolic acids or glycolates of this invention, then the corresponding products are prepared.

A representative list of the products thus prepared is shown in Table I, below.

Table I 4-trifluoromethyl-5,6,7,8-tetrahydro-2-naphthylacetic acid
4-bromo-5,6,7,8-tetrahydro-2-naphthylacetic acid
4-amino-5,6,7,8-tetrahydro-2-naphthylacetic acid
4-dimethylamino-5,6,7,8-tetrahydro-2-naphthylacetic acid
4-fluoro-5,6,7,8-tetrahydro-2-naphthylacetic acid
4-methoxy-5,6,7,8-tetrahydro-2-naphthylacetic acid
4-mercapto-5,6,7,8-tetrahydro-2-naphthylacetic acid
α-methyl-4-chloro-5,6,7,8-tetrahydro-2-naphthylacetic acid
α-methyl-4-amino-5,6,7,8-tetrahydro-2-naphthylacetic acid
α-methyl-4-fluoro-5,6,7,8-tetrahydro-2-naphthylacetic acid
α-ethyl-4-chloro-5,6,7,8-tetrahydro-2-naphthylacetic acid

Example 22 l 4-Chloro-5,6,7,8-tetrahydro-2-naphthylacetic acid

To a boiling solution of 29.4 g. (0.10 mole) of cinchonidine in 1 liter of absolute ethanol is added a boiling solution of 0.10 mole of dl 4-chloro-5,6,7,8-tetrahydro-2-naphthylacetic acid in 500 ml. of absolute ethanol. The solution is stirred briefly then allowed to cool to room temperature overnight. The precipitate is collected and washed with 2 × 25 ml. of ethanol and air dried. Recrystallization from isopropanol gives white needle crystals. This material is hydrolyzed with 200 ml. of 1.2 N-HCl. The white solid is collected, washed with 3 × 50 ml. water and dried at 55°C overnight. Recrystallization from benzenecyclohexane 3:2 gives l 4-chloro-5,6,7,8-tetrahydro-2-naphthylacetic acid.

When modifications of the above resolution procedure is followed but dl 4-chloro-5,6,7,8-tetrahydro-2-naphthylacetic acid is replaced by an equimolar amount of the dl acetic acids of Examples 21 and 22, then the corresponding l-isomer is prepared.

Example 23 d 4-Chloro-5,6,7,8-tetrahydro-2-naphthylacetic acid

The combined ethanol and isopropanol filtrates from Example 22 are evaporated to dryness. This material is triturated with 1 liter of boiling acetone. The material which does not go into solution is filtered off. The filtrate is evaporated to dryness and hydrolyzed with 100 ml. of 1.2 N-HCl. The precipitate is collected, washed with 3 × 25 ml. of water, and dried at 55°C. Recrystallization from benzene-cyclohexane 3:2 gives d 4-chloro-5,6,7,8-tetrahydro-2-naphthylacetic acid.

When modifications of the above resolution procedure is followed but dl 4-chloro-5,6,7,8-tetrahydro-2-naphthylacetic acid is replaced by an equimolar amount of the dl acetic acids of Examples 20 and 21, then the corresponding d-isomer is prepared.

Example 24

4-Chloro-5,6,7,8-tetrahydro-2-naphthylacetic acid, sodium salt

A solution of 12.4 g. of sodium bicarbonate in 135 ml. of water is added dropwise to a stirred solution of 0.164 moles of 4-chloro-5,6,7,8-tetrahydro-2-naphthylacetic acid in 150 ml. of methanol. The solvent is removed in vacuo and the residue is dried by repeated distillations with anhydrous ethanol. The crystalline residue is triturated with ether (100 ml.), collected and washed with ether. The residue is dried in a vacuum desiccator to obtain 4-chloro-5,6,7,8-tetrahydro-2-naphthylacetic acid, sodium salt.

When an equimolar amount of sodium bicarbonate in the above reaction is replaced by the compounds of Table I below, then the corresponding salt is prepared.

Table I sodium hydroxide
potassium hydroxide
calcium hydroxide
potassium carbonate
magnesium bicarbonate When the dl, d and l acetic acid compounds of this invention are used in the above reaction, then the corresponding salt is prepared.

Example 25

4-Chloro-5,6,7,8-tetrahydro-2-naphthylacetic acid, diethylammonium salt

Anhydrous diethylamine (0.11 moles) is added dropwise to a stirred solution of 4-chloro-5,6,7,8-tetrahydro-2-naphthylacetic acid (0.10 moles) in 100 ml. of n-hexane at 0°C. The precipitated diethylammonium salt is collected on a filter washed with n-hexane and dried in a vacuum desiccator to obtain 4-chloro-5,6,7,8-tetrahydro-2-naphthylacetic acid, diethylammonium salt.

When diethylamine in the above reaction is replaced by an equimolar amount of the compounds of Table I, below, then the corresponding product is prepared.

Table I dimethylamine
β-hydroxyethylamine
piperazine
piperidine
α-methylbenzylamine
cyclohexylamine
triethylamine
phenethylamine When the dl, d and l acetic acids of this invention are used in the above reaction, then the corresponding salt is prepared.

Example 26

N-isopropyl-4-chloro-5,6,7,8-tetrahydro-2-naphthylacetamide

Ethyl 4-chloro-5,6,7,8-tetrahydro-2-naphthylacetate (0.1 mole) is stirred with 20 ml. of isopropylamine at about 35°C with stirring overnight and the temperature is then raised to reflux for 28 hours. The reaction mixture is evaporated in vacuo and the residue distilled to obtain N-isopropyl-4-chloro-5,6,7,8-tetrahydro-2-naphthylacetamide.

When isopropylamine in the above reaction is replaced by an equimolar amount of the compound of Table I, below then the corresponding product is prepared.

Table I diethylamine
ethylmethylamine
t-butylamine
cyclopropylamine
N-methylhomopiperazine
isothiazolidine
piperidine
morpholine
N-methylpiperazine When isopropylamine in the above reaction is replaced by ammonia, methylamine or dimethylamine and the reaction carried out in a bomb at 150°C, then the product prepared is 4-chloro-5,6,7,8-tetrahydro-2-naphthylacetamide, N-methyl-4-chloro-5,6,7,8-tetrahydro-2-naphthylacetamide or N,N-dimethyl-4-chloro-5,6,7,8-tetrahydro-2-naphthylacetamide.

When the dl, d or l acetic acids of this invention are used in the above reaction, then the corresponding amide is prepared.

I claim:

1. The compound α-(5,6,7,8-tetrahydro-4-chloro-2-naphthyl)propionic acid.

2. The compound α-(5,6,7,8-tetrahydro-4-chloro-2-naphthyl)propionic acid, diethylamine salt.

* * * * *